(No Model.)
R. L. CREBB, F. KOCH & G. W. MILLER.
HARNESS ATTACHMENT FOR VEHICLES.
No. 344,944. Patented July 6, 1886.
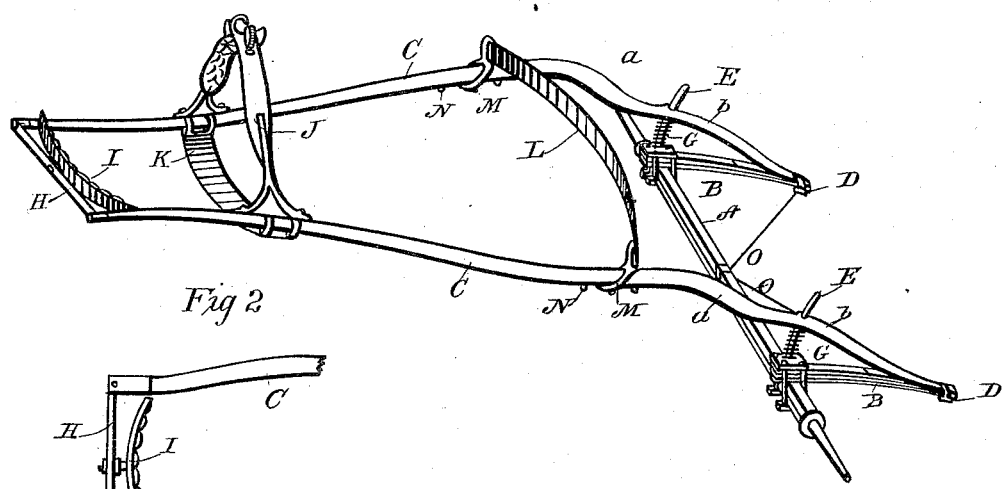
Fig 1
Fig 2
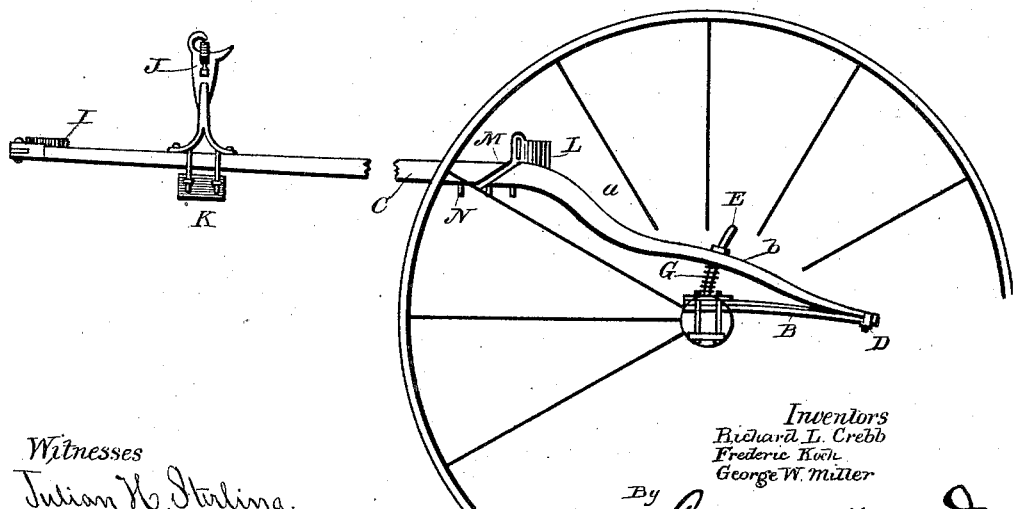
Fig 3
Witnesses
Julian H. Sterling.
W. J. Haviland
Inventors
Richard L. Crebb
Frederic Koch
George W. Miller
By Smith and Hubbard
Attys.

UNITED STATES PATENT OFFICE.

RICHARD L. CREBB, FREDERIC KOCH, AND GEORGE W. MILLER, OF BRIDGEPORT, CONNECTICUT.

HARNESS ATTACHMENT FOR VEHICLES.

SPECIFICATION forming part of Letters Patent No. 344,944, dated July 6, 1886.

Application filed April 15, 1886. Serial No. 197,852. (No model.)

*To all whom it may concern:*

Be it known that we, RICHARD L. CREBB, FREDERIC KOCH, and GEORGE W. MILLER, citizens of the United States, residing at Bridgeport, in the county of Fairfield and State of Connecticut, have invented certain new and useful Improvements in Harness Attachments for Vehicles; and we do hereby declare the following to be a full, clear, and exact description of the invention, such as will enable others skilled in the art to which it appertains to make and use the same.

Our invention relates to certain improvements in harness attachments for vehicles, and has for its objects, first, to provide a device of this description which shall include all parts necessary to a harness save the bridle and reins and shall be attached to the vehicle; second, to furnish means for the securing of a horse to a vehicle which shall give to the animal so secured an appearance of great freedom, while at the same time it in nowise detracts from the certainty of his proper government and guidance; third, to relieve the horse from the weight of the shafts and equipments; fourth, to dispense with the necessity of cumbersome straps upon the horse, thereby freeing the animal from the pressure thereof, and also simplifying the processes of harnessing and unharnessing; and, fifth, in addition to the above, to enable the horse to pull as easily as in the ordinary harness now in use; and with these ends in view our invention consists in the details of construction hereinafter fully explained, and then recited in the claims.

In order that those skilled in the art to which our invention appertains may fully understand its construction and operation we will describe the same in detail, referring by letter to the accompanying drawings, forming a part of this specification, in which—

Figure 1 is a perspective of our device properly secured to the axle of a vehicle; Fig. 2, a detail of the extremities of the shafts, showing the cross-bar and pivoted breast-bar; and Fig. 3 a side elevation of our invention secured to an axle, as in Fig. 1.

Similar letters denote like parts in all the figures of the drawings.

A is an ordinary carriage-axle, preferably square in cross-section. Upon this axle the carriage-body is adapted to be supported in any suitable manner, as by a fifth-wheel; but as the body and its support form no part of our present invention we have not thought it necessary to show them in the drawings.

B represents a pair of springs rigidly secured to the axle, as by means of clips, and which extend backward and downward therefrom.

C represents a pair of shafts, which curve downward just forward of the axle, as at *a*, then are bowed slightly upward, as at *b*, and whose rear ends have a bearing upon the upper surfaces of the springs to about one-third of the length of the latter. Clips D secure the ends of the shafts to the extremities of the springs. This connection of the shafts and springs permits the resiliency of the latter to act downwardly upon the rear ends of the shafts, and as the bearing of the shafts on the upper surface of the springs acts as a fulcrum to thus raise their forward ends.

E represents horns mounted rigidly on top of the spring-clips and curved backward in an arc described from the point of bearing between the shafts and springs. Openings formed vertically through the shafts admit the passage of the horns, and coil-springs G preferably surround the said horns between the shafts and clips, although the springs are not essential to the proper working of our device but are merely auxiliary to the springs B. The outer extremities of the shafts are joined by a cross-bar, H, hinged to the end of one shaft, and having a bolt or catch whereby its free end may be secured to the extremity of the other shaft. To the inner surface of the cross-bar is pivoted a curved breast-bar, I, preferably of metal and covered with leather or padded.

J is a curved metallic yoke, rigidly mounted upon and connecting the shafts, and on the top of this yoke are placed the check-hook and guide-terrets for the reins. The yoke is not intended to have any bearing upon or contact with the horse, but merely to pass above his back. It may be constructed of a simple curved metal rod instead of like an ordinary harness-saddle, as shown in the drawings. A girth, K, adjustable by means of straps and buckles, connects the shafts beneath the horse.

L is a breeching-strap, provided upon its extremities with links M, which latter encircle the shafts. They are adjustable by means of pins N, fixed in the under surface of the shafts and against which the links hold. A pair of braces, O, are preferably extended from the center of the axle to the ends of the springs to stiffen the construction.

From the foregoing it will be observed that the connection of the rear extremities of the shafts to the springs and the bearing of the former upon the latter keeps the shafts always elevated, and the peculiar connection of the shafts to the axle secures to the vehicle immunity from horse motion. We are able in our construction, if desired, to replace the springs by weights; but the construction illustrated we find to be preferable to the modification just mentioned. The horns serve to keep the shafts in their proper planes while permitting vertical movement thereof.

Our invention is utilized as follows: The cross-bar is unfastened and swung around upon its hinge-connection. Then the horse is backed in between the shafts and the cross-bar swung back and secured. Then the breeching is adjusted to the required tension and the girth beneath the horse properly tightened. The tightening of the girth pulls down the shafts against the action of the springs, which by their resiliency relieve the horse altogether from the weight of the shafts, yoke, &c.

In drawing the vehicle the horse's shoulders are in contact with the breast bar, which oscillates on its pivotal point after the manner of an ordinary whiffletree at each step.

In our invention we do not wish to be confined to the exact details of construction shown and described, as many minor changes may be made without departing from the spirit of our invention, the principal features of which are the shafts upheld by springs or their equivalent, the pivoted breast-bar, the adjustable breeching-strap, and the rigid yoke, and the girth whereby the height of the shafts is adjusted and maintained.

Having thus described our invention, what we claim as new, and desire to secure by Letters Patent, is—

1. The combination, with a vehicle-axle, of a pair of springs rigidly secured thereto, a pair of shafts whose rear ends rest upon and are clipped to the ends of the springs, and the backwardly-curving horns or their equivalent, whereby the shafts are retained in position, substantially as set forth.

2. A device of the character described, consisting, essentially, of a pair of shafts upheld from their rear extremities by springs or their equivalent, a hinged cross-bar connecting the forward extremities of the shafts, a pivoted breast-bar secured to said cross-bar, a rigid yoke connecting the shafts and carrying the terrets and check-hook, a suitable girth connecting the shafts, and a breeching-strap adjustably secured to the shafts, substantially as specified.

3. In combination with the axle and shafts of a vehicle, a pair of springs secured to the axle and whose rear ends are clipped to the backwardly-extending extremities of the shafts, whereby the forward ends of the latter are upheld, substantially as specified.

4. The combination, with the spring-upheld shafts provided with the pivoted breast-bar, terret-yoke and girth, of the holdback, whose extremities rest upon the shafts and are adjustably held thereto by means of the links embracing the shafts and bearing against pins set in the under surface of the latter, substantially as set forth.

In testimony whereof we affix our signatures in presence of two witnesses.

RICHARD L. CREBB.
FREDERIC KOCH.
GEORGE W. MILLER.

Witnesses:
S. H. HUBBARD,
S. S. WILLIAMSON.